(12) United States Patent
Berthout et al.

(10) Patent No.: US 10,889,502 B2
(45) Date of Patent: Jan. 12, 2021

(54) DIRECT SYNTHESIS OF A MICROPOROUS ALUMINOSILICATE MATERIAL HAVING AN AFX STRUCTURE AND COMPRISING COPPER, AND USE OF SAID MATERIAL

(71) Applicant: IFP Energies nouvelles, Rueil-Malmaison (FR)

(72) Inventors: David Berthout, Vaugneray (FR); Bogdan Harbuzaru, Simandres (FR); Eric Llido, Communay (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/631,910

(22) PCT Filed: Jul. 12, 2018

(86) PCT No.: PCT/EP2018/068907
§ 371 (c)(1),
(2) Date: Jan. 17, 2020

(87) PCT Pub. No.: WO2019/016063
PCT Pub. Date: Jan. 24, 2019

(65) Prior Publication Data
US 2020/0156949 A1 May 21, 2020

(30) Foreign Application Priority Data
Jul. 18, 2017 (FR) ...................... 17 56800

(51) Int. Cl.
*C01B 39/06* (2006.01)
*C01B 39/48* (2006.01)
(Continued)

(52) U.S. Cl.
CPC .......... *C01B 39/06* (2013.01); *B01D 53/9418* (2013.01); *B01J 6/001* (2013.01);
(Continued)

(58) Field of Classification Search
CPC ......... C01B 39/06; C01B 39/48; B01J 29/76; B01J 35/04; B01D 53/9418; B01D 2255/50
See application file for complete search history.

(56) References Cited

U.S. PATENT DOCUMENTS

| 5,194,235 A * | 3/1993 | Zones ..................... C01B 39/48 423/704 |
| 2015/0151286 A1* | 6/2015 | Rivas-Cardona ...... B01J 29/763 423/703 |
| 2016/0137518 A1 | 5/2016 | Rivas-Cardona et al. |

FOREIGN PATENT DOCUMENTS

| JP | 2014-148441 A | 8/2014 |
| WO | 2013/159828 A1 | 10/2013 |

(Continued)

OTHER PUBLICATIONS

International Search Report for PCT/EP2018/068907, dated Sep. 12, 2018; English translation submitted herewith (7 pgs.).

*Primary Examiner* — David M Brunsman
(74) *Attorney, Agent, or Firm* — Fitch, Even, Tabin & Flannery, LLP

(57) ABSTRACT

The invention concerns a process for preparing a copper-comprising microporous aluminosilicate material with AFX structure, comprising at least the steps of mixing, in an aqueous medium, at least one aluminum source, at least one silicon source, at least one copper source, a TETA or TEPA organic complexing agent and a DABCO-C4 structuring agent, in order to obtain a gel, and hydrothermal treatment of said gel with stirring in order to obtain crystallization of said copper-comprising microporous aluminosilicate material with AFX structure.

16 Claims, 2 Drawing Sheets

(51) Int. Cl.
*B01J 29/76* (2006.01)
*B01J 6/00* (2006.01)
*B01J 29/035* (2006.01)
*B01J 29/70* (2006.01)
*B01J 35/04* (2006.01)
*B01J 37/02* (2006.01)
*B01J 37/04* (2006.01)
*B01D 53/94* (2006.01)
*F01N 3/20* (2006.01)

(52) U.S. Cl.
CPC .......... *B01J 29/0356* (2013.01); *B01J 29/70* (2013.01); *B01J 29/76* (2013.01); *B01J 35/04* (2013.01); *B01J 37/0215* (2013.01); *B01J 37/0236* (2013.01); *B01J 37/04* (2013.01); *C01B 39/48* (2013.01); *B01D 2255/50* (2013.01); *F01N 3/2066* (2013.01); *F01N 2570/14* (2013.01); *F01N 2610/02* (2013.01); *F01N 2610/04* (2013.01)

(56) References Cited

FOREIGN PATENT DOCUMENTS

| | | |
|---|---|---|
| WO | 2014/090698 A1 | 6/2014 |
| WO | 2017/080722 A1 | 5/2017 |

* cited by examiner

DIRECT SYNTHESIS OF A MICROPOROUS ALUMINOSILICATE MATERIAL HAVING AN AFX STRUCTURE AND COMPRISING COPPER, AND USE OF SAID MATERIAL

CROSS-REFERENCE TO RELATED APPLICATIONS

This application is a U.S. national phase application filed under 35 U.S.C. § 371 of International Application No. PCT/EP2018/068907, filed Jul. 12, 2018, designating the United States, which claims priority from French Patent Application No. 17/56.800, filed Jul. 18, 2017, which are hereby incorporated herein by reference in their entirety.

TECHNICAL FIELD OF THE INVENTION

The subject matter of the invention is a process for preparing a microporous aluminosilicate zeolite material with AFX structure, and also the use of this material, in particular for the selective catalytic reduction of NOx in the presence of a reducing agent, especially on diesel or controlled-ignition engines.

PRIOR ART

Zeolites exchanged with transition metals are used as catalysts for applications of selective catalytic reduction (SCR) with ammonia ($NH_3$-SCR), in transport. Small-pore zeolites, particularly copper-exchanged chabazites, are particularly suitable. They exist commercially in the form of silico-aluminophosphate Cu-SAPO-34, or aluminosilicates Cu-SSZ-13 (or Cu-SSZ-62). Their hydrothermal resistance and NOx conversion efficiency, in particular at low temperatures, make them the current references.

The use of zeolites with AFX structure for $NH_3$-SCR applications is known, but few studies evaluate the efficiency of catalysts using this zeolite.

Fickel et al. (Fickel, D W, & Lobo, R F (2009), The Journal of Physical Chemistry C, 114 (3), 1633-1640) studies the use of a copper-exchanged SSZ-16 (with AFX structure) for NOx removal. This zeolite is synthesized in accordance with U.S. Pat. No. 5,194,235, in which Cu is introduced by exchange using copper(II) sulfate at 80° C. for 1 h. Recent results (Fickel, D W, D'Addio, E., Lauterbach, J A, & Lobo, R F (2011), 102 (3), 441-448) show excellent conversion and good hydrothermal resistance for copper-loading at 3.78% by weight.

Work on the synthesis of zeolites with AFX structure has been carried out with various structural agents (Lobo, R F, Zones, S I, & Medrud, R C (1996), Chemistry of Materials, 8 (10), 2409-2411) as well as synthesis optimization work (Hrabanek, P., Zikanova, A., Supinkova, T., Drahokoupil, J., Fila, V., Lhotka, M., Bernauer, B. (2016), Microporous and Mesoporous Materials, 228, 107-115).

Wang et al. (Wang, D. et al., CrystEngComm., (2016), 18 (6), 1000-1008) have studied the replacement of the TMHD structuring agent with a TEA-TMA mixture for the formation of SAPO-56 and obtained unwanted SAPO-34 and SAPO-20 phases. The incorporation of transition metals is not discussed.

US 2016/0137518 describes the synthesis of a quasi-pure AFX zeolite exchanged with a transition metal and its use for $NH_3$-SCR applications. No particular form of AFX zeolite is mentioned.

Document JP 2014-148441 describes the synthesis of an AFX zeolite, in particular a copper-comprising SAPO-56 which can be used for $NO_x$ reduction. The AFX zeolite is synthesized and then added to a mixture comprising an alcohol and a copper salt, the whole mixture being calcined. The copper is thus added once the SAPO zeolite with AFX structure is formed. This zeolite appears to have increased resistance to the presence of water.

WO 2017/080722 discloses a direct synthesis of a copper-comprising zeolite. This synthesis requires starting from a zeolite with FAU structure and using a complexing agent TEPA and an element $M(OH)_x$ to obtain zeolites of various types, mainly of CHA type. Zeolites of ANA, ABW, PHI and GME type are also produced.

The applicant has discovered a process for the preparation of a copper-comprising microporous aluminosilicate material with AFX structure, exhibiting advantageous performance levels for $NO_x$ conversion, in particular greater than those obtained with copper-exchanged zeolites with AFX structure.

An advantage of the process according to the invention is to obtain, by means of a set of specific operating conditions, an aminosilicate zeolite with pure AFX structure, that is to say without any other crystalline or amorphous phase being observed by X-ray diffraction (XRD).

Subject and Advantage of the Invention

The direct synthesis process according to the invention makes it possible to obtain a copper-comprising aminosilicate material with AFX structure having improved properties compared to the catalysts of the prior art. In particular, using the catalyst prepared according to the invention makes it possible to obtain a better conversion in the $NO_x$ conversion reaction.

DETAILED DESCRIPTION OF THE INVENTION

The invention relates to a process for preparing a copper-containing microporous aluminosilicate material with AFX structure, comprising at least the following steps:

a) mixing, in an aqueous medium, of at least one aluminum source, at least one silicon source, sodium hydroxide, at least one copper source, an organic complexing agent chosen from triethylenetetramine (TETA) or tetraethylenepentamine (TEPA) and a structuring agent 1,4-diazabicyclo-[2.2.2]octane-C4-diquat dibromide (DABCO-C4), in order to obtain a gel of molar composition:

$aSiO_2:bAl_2O_3:cNa_2O:dDABCO\text{-}C4:eCuO:fOCPLX:gH_2O$ a/b being between 100 and 40, c/b being between 25 and 50, d/b being between 3 and 10, e/b being between 0.05 and 0.1, f/e being between 1 and 1.5 and g/b being between 4000 and 1000;

b) hydrothermal treatment of said gel at a temperature of between 130 and 180° C., under an autogenous reaction pressure, for a period of between 1 and 8 days with stirring in order to obtain the crystallization of said copper-comprising microporous aluminosilicate material with AFX structure;

c) drying heat treatment of the solid obtained at the end of the preceding step at a temperature of between 80 and 120° C. under a stream of inert gas followed by calcining under dry air at a temperature of between 400 and 600° C.;

d) ion exchange comprising bringing the solid obtained at the end of the preceding step into contact with the solution comprising a species capable of releasing copper in solution in reactive form with stirring at ambient temperature for a period of between 1 h and 2 d;

e) drying heat treatment of the solid obtained at the end of the preceding step at a temperature of between 80 and 120° C. followed by calcining under a stream of inert gas and then air at a temperature of between 400 and 600° C.;

it being possible for steps c) and d) to advantageously be inverted, the total amount of copper contained in the material obtained at the end of said preparation process being between 1.5 and 5.75% by weight relative to the total weight of said material in its anhydrous form.

Mixing Step a)

The preparation process according to the invention comprises a step a) of mixing, in an aqueous medium, of at least one aluminum source, at least one silicon source, a sodium hydroxide source, at least one copper source, an organic OCPLX complexing agent chosen from TETA (triethylenetetramine) and TEPA (tetraethylenepentamine) and a DABCO-C4 structuring agent in order to obtain a gel of formula:

$a\text{SiO}_2:b\text{Al}_2\text{O}_3:c\text{Na}_2\text{O}:d\text{DABCO-C4}:e\text{CuO}:f\text{OCPLX}:g\text{H}_2\text{O}$ a/b being between 40 and 100, c/b being between 20 and 50, d/b being between 3 and 10, e/b being between 0.05 and 0.1, f/e being between 1 and 1.5 and g/b being between 1000 and 4000.

Preferably, a/b is between 40 and 90, more preferably from 50 to 70. Preferably, c/b is between 30 and 40, more preferably from 25 to 35. Preferably, d/b is between 4 and 8, more preferably between 5 and 7. Preferably, e/b is between 0.05 and 0.09, more preferably between 0.06 and 0.075. Preferably, f/e is between 1 and 1.5. Preferably, g/b is between 1500 and 3000, more preferably from 2000 to 2500.

The aluminum source may be any aluminum source known to those skilled in the art. In particular, the aluminum source is preferably sodium aluminate or an aluminum salt, for example chloride, nitrate, hydroxide or sulfate, an aluminum alkoxide or alumina as such, preferably in hydrated or hydratable form, such as, for example, colloidal alumina, pseudo-boehmite, gamma-alumina or alpha or beta trihydrate, or an aluminosilicon zeolite such as, for example, zeolites Y or USY (Ultrastable Y, with FAU structure). Mixtures of the sources mentioned above may be used. Preferably, the aluminium source is the zeolite Y.

The silicon source may be any silicon source known to those skilled in the art. In particular, the silicon source is preferably powdered silica, sodium silicate, silicic acid, colloidal silica, dissolved silica or tetraethoxysilane (TEOS) or an aluminosilicon zeolite such as, for example, USY (Ultrastable Y, with FAU structure). Among the powdered silicas, precipitated silicas, especially those obtained by precipitation from a solution of alkali metal silicate, fumed silicas, for example Cab-O-Sil, and silica gels may be used. Colloidal silicas having various particle sizes, for example a mean equivalent diameter of between 10 and 15 nm or between 40 and 50 nm may be used, such as those sold under registered brand names such as Ludox. Preferably, the silicon source is sodium silicate.

The copper source is at least one species capable of releasing copper in solution in reactive form, such as, for example, sulfates, nitrates, chlorides, oxalates, organometallic copper complexes, but also mixtures of the sources mentioned above. Preferably, the copper source is chosen from sulfates and nitrates.

The structurant agent is 1,4-diazabicyclo[2.2.2]octane-C4-diquat dibromide (DABCO-C4). This structurant agent makes it possible to obtain a microporous aluminosilicate material with AFX structure. Other agents may be used to obtain SAPO zeolites with AFX structure, but do not make it possible to obtain a microporous aluminosilicate material with AFX structure, advantageously SSZ-16.

The organic complexing agent (OCPLX) used in step a) of the process according to the invention is chosen from triethylenetetramine (TETA) or tetraethylenepentamine (TEPA).

The mixing of step a) is advantageously carried out at ambient temperature with stirring to enable a good mixing of the various sources. A maturation step at ambient temperature is advantageously carried out at the end of step a) and before step b). This maturation step is carried out at ambient temperature, i.e. at a temperature of between 15 and 35° C., advantageously between 20 and 30° C., advantageously with stirring. This maturation step enables a faster crystallization of the zeolite during step b) of the process according to the invention.

Hydrothermal Treatment Step b)

The preparation process according to the invention comprises a step b) of hydrothermal treatment of said gel at a temperature of between 130 and 180° C., under an autogenous reaction pressure and with stirring, for a period of between 3 and 8 days in order to obtain the crystallization of said copper-comprising aluminosilicate material with AFX structure.

In accordance with step b) of the process according to the invention, the gel obtained at the end of the mixing step a) is subjected to a hydrothermal treatment, carried out at a temperature of between 130 and 180° C., preferably between 140 and 170° C., under an autogenous reaction pressure, for a period of between 1 and 8 days, preferably between 3 and 6 days, to obtain the crystallization of said aluminosilicate zeolite with AFX structure. At the end of the hydrothermal treatment, the solid obtained is filtered off, washed and then dried to obtain said aluminosilicate material with AFX structure in powder form.

The gel is advantageously placed under hydrothermal conditions under an autogenous reaction pressure, by adding gas, for example nitrogen.

Step b) of the preparation process according to the invention is carried out with a rate of stirring of between 100 and 4000 rpm, preferably between 200 and 2000 rpm.

At the end of step b), the copper-comprising aluminosilicate material with AFX structure, advantageously a copper-exchanged SSZ-16, without the presence of other crystalline or amorphous phases observable by XRD is obtained. Its X-ray diffraction pattern corresponds to the International Center for Diffraction Data (ICDD) sheet number: 04-013-1370.

Heat Treatment Step c)

The preparation process according to the invention advantageously comprises a heat treatment step c) carried out after the preceding step, i.e. step b) or step d) in the preferred case in which steps c) and d) are inverted, comprising a treatment by drying at a temperature of between 80 and 120° C. under inert gas, advantageously dry inert gas, advantageously nitrogen, for a period of between 5 and 15 hours, preferentially between 6 and 9 hours, followed by calcination treatment in dry air, at a temperature of between 400 and 600° C., preferentially between 500 and 600° C. for a period of between 5 and 10 hours, preferentially between 6 and 9 hours, the dry air flow rate preferably being between 0.5 and 1.5 l/h/g of solid to be treated, preferentially between 0.7 and 1.2 l/g/h.

The first treatment under inert gas allows in particular a thermocracking of the organic molecules before releasing the porosity during the combustion treatment. In particular, said treatment under inert gas makes it possible to maintain the integrity of the structure of the material prepared by the process according to the invention during the combustion treatment.

The material obtained is in the form of a light blue-colored powder, the intensity of which depends on the amount of copper contained and its X-ray diffraction pattern corresponds to an aluminosilicate with AFX structure, as defined by the International Zeolite Association (IZA). The amount of copper contained in said material can range from 0.75 to 2% by weight of the total weight of the material in its anhydrous form.

Exchange Step d)

The preparation process according to the invention advantageously comprises an ion exchange step which comprises bringing the solid obtained at the end of the preceding step, i.e. at the end of step b) or of step c) in the preferred case in which steps c) and d) are inverted, into contact with a solution comprising a species capable of releasing copper in solution in reactive form, with stirring at ambient temperature for a period of between 1 h and 2 d, advantageously for a period of between 0.5 and 1.5 d, the concentration of said species capable of releasing copper in said solution being as a function of the amount of copper that it is desired incorporate into said solid. At the end of the exchange, the solid obtained is filtered off, washed and then dried to obtain said aluminosilicate zeolite with AFX structure in powder form. The amount of copper contained in said material is ultimately between 1.5 and 5.75% by weight relative to the total weight of the material in its anhydrous form.

It has been discovered that the incorporation of the copper in two steps, by direct incorporation during the mixing according to step a) and by exchange during step d), makes it possible to obtain materials having better properties than materials comprising the same content of copper, said copper having been incorporated by direct incorporation or by exchange.

Advantageously, the amount of copper introduced during step a) represents between 0.75 and 2%, the amount of copper introduced during step d) representing between 0.75 and 5%, the total amount of copper contained in said material being ultimately, i.e. at the end of the preparation process according to the invention, between 1.5 and 5.75%, all the percentages being percentages by weight relative to the total weight of the material in its anhydrous form obtained at the end of the preparation process according to the invention. Advantageously, between 25 and 45% of the total copper is introduced during step a) and preferably between 30 and 40% of the total copper is introduced during step a).

Heat Treatment Step e)

The preparation process according to the invention advantageously comprises a heat treatment step e) carried out at the end of the preceding step comprising a treatment under dry inert gas, advantageously nitrogen, at a temperature of between 400 and 600° C., preferentially between 500 and 600° C., for a period of between 5 and 15 hours, preferentially between 6 and 9 hours, followed by combustion treatment in dry air, at a temperature of between 400 and 600° C., preferentially between 500 and 600° C. for a period of between 5 and 10 hours, preferentially between 6 and 9 hours, the dry air flow rate preferably being between 0.5 and 1.5 l/h/g of solid to be treated, preferentially between 0.7 and 1.2 l/g/h.

The Applicant has discovered that the material obtained by the process according to the invention has characteristics different than the copper-comprising aluminosilicate materials with AFX structure known hitherto. In particular, the material obtained by the process according to the invention has improved properties for $NO_x$ conversion. The invention therefore also relates to a copper-comprising microporous aluminosilicate material with AFX structure obtained, or capable of being obtained by, by a preparation process as described in the present application.

The material prepared in accordance with the invention is not a silico-aluminophosphate (SAPO) material and could not be obtained by SAPO-preparation processes.

Characterization of the Catalyst Prepared According to the Invention

The material prepared according to the invention has an AFX structure according to the classification of the International Zeolite Association (IZA). This structure is characterized by X-ray diffraction (XRD).

The X-ray diffraction (XRD) pattern is obtained by radiocrystallographic analysis by means of a diffractometer using the conventional powder method with Kai radiation of copper ($\lambda$=1.5406 Å). On the basis of the position of the diffraction peaks represented by the angle 2θ, the lattice constant distances $d_{hkl}$ characteristic of the sample are calculated using the Bragg relationship. The measurement error $\Delta(d_{hkl})$ on $d_{hkl}$ is calculated by virtue of the Bragg relationship as a function of the absolute error $\Delta(2\theta)$ assigned to the measurement of 2θ. An absolute error $\Delta(2\theta)$ equal to ±0.02° is commonly accepted. The relative intensity $I_{rel}$ assigned to each value of $d_{hkl}$ is measured according to the height of the corresponding diffraction peak. Comparison of the diffraction pattern with the ICDD (International Center for Diffraction Data) database sheets using software such as, for example, DIFFRACT.SUITE also makes it possible to identify the crystal phases present in the material obtained.

The qualitative and quantitative analysis of the chemical species present in the materials obtained is carried out by X-ray fluorescence (XRF) spectrometry. This is a technique of chemical analysis using a physical property of matter, the X-ray fluorescence. The spectrum of X-rays emitted by the material is characteristic of the composition of the sample; by analyzing this spectrum, it is possible to deduce the elemental composition, that is to say the mass concentrations of elements.

The loss on ignition of a sample, referred to as LOI, is calculated as the difference in mass of the sample before and after calcining at 550° C. for 2 h. It is expressed in % corresponding to the percentage loss of mass.

Use of the Catalyst Prepared According to the Invention

The invention also relates to the use of the material prepared by the process according to the invention, advantageously formed by deposition in the form of a washcoat on a filtering or non-filtering, honeycomb structure, for selective reduction of $NO_x$ using a reducing agent such as $NH_3$ or $H_2$. Said honeycomb structure thus coated constitutes a catalytic block. Said structure may be composed of cordierite, silicon carbide (SiC), aluminum titanate (AlTi) or any other material of which the porosity is between 30 and 70%. The amount of material prepared by the process according to the invention that is deposited on said structure is between 40 and 140 g/l for filtering structures and between 120 and 200 g/l for structures with open channels.

The actual washcoat comprises the copper-comprising aluminosilicate material with AFX structure prepared according to the invention, advantageously in combination with a binder such as cerine, zirconium oxide, alumina, non-zeolite silica-alumina, titanium oxide, a cerine-zirconia mixed oxide, or a tungsten oxide. Said washcoat is advantageously a solution or a suspension. It is applied to said structure in any manner known to those skilled in the art.

Said structure may be coated with one or more layers. The coating comprising the copper-comprising aluminosilicate material with AFX structure prepared according to the invention is advantageously in combination with, that is to say covers a or is covered by, another coating having NOx reducing capacities or capacities which promote the oxidation of pollutants, in particular that of ammonia.

Said structure coated with the material prepared by the process according to the invention is advantageously integrated in an exhaust line of an internal combustion engine operating mainly in lean mixture mode, that is to say with excess air relative to the stoichiometry of the combustion reaction, as is the case with diesel engines for example. Under these engine operating conditions, the exhaust gases contain the following pollutants: soot, unburned hydrocarbons (HCs), carbon monoxide (CO), nitrogen oxides (NOx). Upstream of said structure may be placed an oxidation catalyst of which the function is to oxidize HCs and CO and a filter for removing soot from the exhaust gases, the function of said structure being to remove the NOx, its operating range being between 100 and 900° C. and preferably between 200° C. and 500° C.

EXAMPLES

Figure 1:
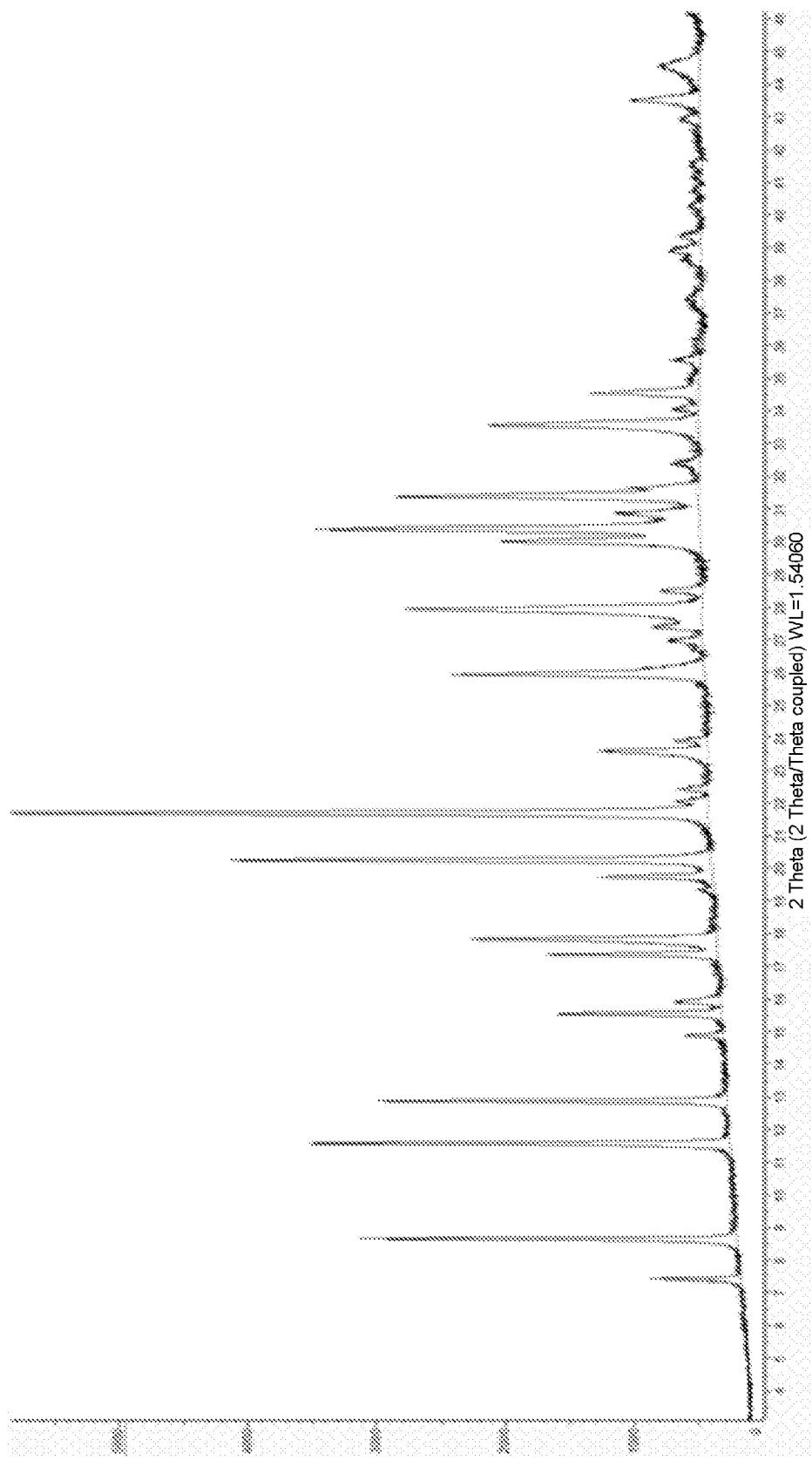
FIG. 1 shows an X-ray diffraction pattern of the Cu-aluminosilicate material prepared in example 4.

Example 1 (not in Accordance with the Invention)

In this example, a Cu-exchanged SSZ-16 zeolite is synthesized according to the prior art. In this example, the copper is introduced by ion exchange.

Mixing Step 17.32 g of sodium hydroxide are dissolved in 582.30 g of deionized water, with stirring (300 rpm) and at ambient temperature. 197.10 g of sodium silicate are added to this solution and the mixture is homogenized with stirring (300 rpm) at ambient temperature. Then, 9.95 g of NaY CBV100 zeolite are added with stirring (300 rpm) and this is thus continued until the zeolite has dissolved. 43.67 g of the DABCO-C4 structuring agent are dissolved in the solution obtained and it is thus homogenized with stirring (450 rpm) for 30 minutes, at ambient temperature.

The reaction mixture has the following molar composition: 100 $SiO_2$: 1.67 $Al_2O_3$: 50 $Na_2O$: 10 DABCO-C4: 4000 $H_2O$ Maturation Step The reaction mixture obtained in the mixing step is kept at ambient temperature with stirring for 24 hours.

Hydrothermal Treatment Step

The gel obtained is left in an autoclave at a temperature of 150° C. for 6 days with stirring (200 rpm). The crystals obtained are separated and washed with deionized water until a pH of the washing water of less than 8 is obtained. The washed material is dried.

An XRD analysis shows that the product obtained is a pure crude synthetic SSZ-16 zeolite with AFX structure (ICDD sheet, PDF 04-03-1370).

Heat Treatment Step

The crude synthetic SSZ-16 zeolite is treated under a stream of dry $N_2$ at 550° C. for 8 h, then calcined under a stream of dry air at 550° C. for 8 h. The loss on ignition (LOI) is 18% by weight.

$NH_4^+$ Ion Exchange on Calcined SSZ-16

The calcined SSZ-16 zeolite is brought into contact with a 3 molar $NH_4NO_3$ solution for 5 hours with stirring at ambient temperature. The ratio between the volume of $NH_4NO_3$ solution and the weight of solid is 10. The solid obtained is filtered off and washed and the exchange procedure is repeated once more under the same conditions. The final solid is separated, washed and dried. An XRD analysis shows that the product obtained is a pure crude synthetic SSZ-16 zeolite in ammoniacal form (NH4-SSZ-16) with AFX structure (ICDD sheet, PDF 04-03-1370).

Heat Treatment Step

The SSZ-16 zeolite in ammoniacal form (NH4-SSZ-16) is treated under a stream of dry air at 550° C. for 8 hours with a temperature increase ramp of 1° C./min The loss on ignition (LOI) is 4% by weight. The product obtained is an SSZ-16 zeolite in protonated form (H-SSZ-16).

Cu Ion Exchange on H-SSZ-16

The H-SSZ-16 zeolite is brought into contact with a $[Cu(NH_3)_4](NO_3)_2$ solution for 1 day with stirring at ambient temperature. The final solid is separated, washed and dried. An XRD analysis shows that the product obtained is a pure SSZ-16 zeolite with AFX structure (ICDD sheet, PDF 04-03-1370).

The X-ray fluorescence (XRF) chemical analysis gave an Si/Al molar ratio of 6.5 and a weight percentage of Cu of 3%.

Example 2 (not in Accordance with the Invention)

Synthesis of an SSZ-16 Zeolite with Direct Incorporation of Cu Using a Tetraethylenepentamine (TEPA) Complexing Agent Mixing Step 2.64 g of sodium hydroxide dissolved in 77.92 g of deionized water, with stirring (300 rpm) and at ambient temperature. 30.06 g of sodium silicate are added to this solution and the mixture is homogenized with stirring (300 rpm) at ambient temperature. Then, 1.52 g of NaY CBV100 zeolite are poured into the solution previously obtained with stirring at 300 rpm and this is thus continued until the zeolite has dissolved. This solution is referred to as solution 2-1.

0.14 g of copper sulfate are dissolved in 10.94 g of deionized water with stirring for 10 minutes then 0.11 g of tetraethylenepentamine (TEPA) are dissolved in this copper solution. Then, the solution is poured into the solution 2-1 with stirring at 300 rpm. The mixture is homogenized for 10 min with stirring (300 rpm) and then 6.67 of the DABCO-C4 structuring agent are added and it is thus homogenized with stirring at 300 rpm for 10 minutes, at ambient temperature.

The reaction mixture has the following molar composition: 100 $SiO_2$: 1.67 $Al_2O_3$: 50 $Na_2O$: 10 DABCO-C4: 0.38 CuO: 0.38 TEPA: 4000 $H_2O$ Maturation Step The reaction mixture obtained in the mixing step is kept at ambient temperature with stirring for 24 hours.

Hydrothermal Treatment Step

The gel obtained is left in an autoclave at a temperature of 150° C. for 6 days with stirring at 200 rpm. The crystals obtained are separated and washed with deionized water until a pH of the washing water of less than 8 is obtained. The washed material is dried.

Heat Treatment (Calcination) Step

The crude synthetic SSZ-16 zeolite is treated under a stream of dry $N_2$ at 550° C. for 8 h, then calcined under a stream of dry air at 550° C. for 8 h.

The XRD analyses of the calcined zeolite show that the product obtained is an SSZ-16 aluminosilicate zeolite (ICDD sheet, PDF 04-03-1370). The X-ray fluorescence (XRF) chemical analysis gave an Si/Al molar ratio of 6.5 and a weight percentage of Cu of 3%.

Example 3 (in Accordance with the Invention)

In this example, an SSZ-16 zeolite is synthesized with incorporation of the copper in two steps: first step in the synthesis of the zeolite using a Cu-Tetraethylenepentamine (TEPA) complex followed by a second step after the calcination of the zeolite by ion exchange with the $[Cu(NH_3)_4](NO_3)_2$ complex.

Mixing Step 2.64 g of sodium hydroxide dissolved in 77.92 g of deionized water, with stirring (300 rpm) and at ambient temperature. 30.06 g of sodium silicate are added to this solution and the mixture is homogenized with stirring at 300 rpm at ambient temperature. Then, 1.52 g of NaY CBV100 zeolite are poured into the solution previously obtained with stirring at 300 rpm and this is thus continued until the zeolite has dissolved. This solution is referred to as solution 2-1.

0.05 g of copper sulfate are dissolved in 10.94 g of deionized water with stirring for 10 minutes then 0.05 g of tetraethylenepentamine (TEPA) are dissolved in this copper solution. Then, the solution is poured into the solution 2-1 with stirring at 300 rpm. The mixture is homogenized for 10 min with stirring (300 rpm) and then 6.67 of the DABCO-C4 structuring agent are added and it is thus homogenized with stirring at 300 rpm for 10 minutes, at ambient temperature.

The reaction mixture has the following molar composition: 100 $SiO_2$: 1.67 $Al_2O_3$: 50 $Na_2O$: 10 DABCO-C4: 0.13 CuO: 0.13 TEPA: 4000 $H_2O$ Maturation Step The reaction mixture obtained in the mixing step is kept at ambient temperature with stirring for 24 hours.

Hydrothermal Treatment Step

The gel obtained is left in an autoclave at a temperature of 150° C. for 6 days with stirring at 200 rpm. The crystals obtained are separated and washed with deionized water until a pH of the washing water of less than 8 is obtained. The washed material is dried.

Heat Treatment (Calcination) Step

The crude synthetic Cu-SSZ-16 zeolite is treated under a stream of dry $N_2$ at 550° C. for 8 h, then calcined under a stream of dry air at 550° C. for 8 h.

The XRD analyses show that the product obtained is an SSZ-16 aluminosilicate zeolite (ICDD sheet, PDF 04-03-1370). The X-ray fluorescence (XRF) chemical analysis gave an Si/Al molar ratio of 6.5 and a weight percentage of Cu of 1%.

Cu Ion Exchange on Cu-SSZ-16

The calcined Cu-SSZ-16 zeolite is bought into contact with a $[Cu(NH_3)_4](NO_3)_2$ solution for 1 day with stirring at ambient temperature. The final solid is separated, washed and dried.

Heat Treatment (Calcination) Step

The Cu-SSZ-16 zeolite obtained after contact with the $[Cu(NH_3)_4](NO_3)_2$ solution is treated under a stream of dry $N_2$ at 550° C. for 8 h, then calcined under a stream of dry air at 550° C. for 8 h.

An XRD analysis shows that the product obtained is a pure SSZ-16 zeolite with AFX structure (ICDD sheet, PDF 04-03-1370).

The X-ray fluorescence (XRF) chemical analysis gave an Si/Al molar ratio of 6.5 and a weight percentage of Cu of 3%.

Example 4 (in Accordance with the Invention)

In this example, an SSZ-16 zeolite is synthesized with incorporation of the copper in two steps: first step in the synthesis of the zeolite using a Cu-Triethylenetetramine (TETA) complex followed by a second step after the calcination of the zeolite by ion exchange with the $[Cu(NH_3)_4](NO_3)_2$ complex.

Mixing Step 17.37 g of sodium hydroxide are dissolved in 507 g of deionized water, with stirring (300 rpm) and at ambient temperature. 198 g of sodium silicate are added to this solution and the mixture is homogenized with stirring at 300 rpm at ambient temperature. Then, 9.95 g of NaY CBV100 zeolite are poured into the solution previously obtained with stirring at 300 rpm and this is thus continued until the zeolite has dissolved. This solution is referred to as solution 4-1.

0.32 g of copper sulfate are dissolved in 73 g of deionized water with stirring for 10 minutes then 0.19 g of triethylenetetramine (TETA) are dissolved in this copper solution. Then, the solution is poured into the solution 4-1 with stirring at 300 rpm. The mixture is homogenized for 10 min with stirring (300 rpm) and then 43.7 of the DABCO-C4 structuring agent are added and it is thus homogenized with stirring at 300 rpm for 10 minutes, at ambient temperature.

The reaction mixture has the following molar composition: 100 $SiO_2$: 1.67 $Al_2O_3$: 50 $Na_2O$: 10 DABCO-C4: 0.13 CuO: 0.13 TETA: 4000 $H_2O$ Maturation Step The reaction mixture obtained in the mixing step is kept at ambient temperature with stirring for 24 hours.

Hydrothermal Treatment Step

The gel obtained is introduced into an autoclave and heated at a temperature of 150° C. for 6 days with stirring at 200 rpm. The crystals obtained are separated and washed with deionized water until a pH of the washing water of less than 8 is obtained. The washed material is dried.

Heat Treatment (Calcination) Step

The crude synthetic Cu-SSZ-16 zeolite is treated under a stream of dry $N_2$ at 550° C. for 8 h, then calcined under a stream of dry air at 550° C. for 8 h.

The XRD analyses of the calcined zeolite show that the product obtained is an SSZ-16 aluminosilicate zeolite (ICDD sheet, PDF 04-03-1370). The X-ray fluorescence (XRF) chemical analysis gave an Si/Al molar ratio of 6.5 and a weight percentage of Cu of 1%.

Cu Ion Exchange on Cu-SSZ-16

The calcined Cu-SSZ-16 zeolite is bought into contact with a [Cu(NH$_3$)$_4$](NO$_3$)$_2$ solution for 1 day with stirring at ambient temperature. The final solid is separated, washed and dried.

Heat Treatment (Calcination) Step

The Cu-SSZ-16 zeolite obtained after contact with the [Cu(NH$_3$)$_4$](NO$_3$)$_2$ solution is treated under a stream of dry N$_2$ at 550° C. for 8 h, then calcined under a stream of dry air at 550° C. for 8 h.

An XRD analysis shows that the product obtained is a pure SSZ-16 zeolite with AFX structure (ICDD sheet, PDF 04-03-1370).

The X-ray fluorescence (XRF) chemical analysis gave an Si/Al molar ratio of 6.5 and a weight percentage of Cu of 3%.

Example 5 (not in Accordance with the Invention)

In this example, an SSZ-16 zeolite is synthesized with incorporation of the copper in two steps: first step in the synthesis of the zeolite using a Cu-Triethylenetetramine (TETA) complex followed by a second step after the calcination of the zeolite by ion exchange with the [Cu(NH$_3$)$_4$](NO$_3$)$_2$ complex. The final percentage of Cu in the calcined zeolite is greater than 6%.

Mixing Step 17.37 g of sodium hydroxide are dissolved in 507 g of deionized water, with stirring (300 rpm) and at ambient temperature. 198 g of sodium silicate are added to this solution and the mixture is homogenized with stirring at 300 rpm at ambient temperature. Then, 9.95 g of NaY CBV100 zeolite are poured into the solution previously obtained with stirring at 300 rpm and this is thus continued until the zeolite has dissolved. This solution is referred to as solution 4-1.

0.32 g of copper sulfate are dissolved in 73 g of deionized water with stirring for 10 minutes then 0.19 g of triethylenetetramine (TETA) are dissolved in this copper solution. Then, this solution is poured into the solution 4-1 with stirring at 300 rpm. The mixture is homogenized for 10 min with stirring (300 rpm) and then 43.7 of the DABCO-C4 structuring agent are added and it is thus homogenized with stirring at 300 rpm for 10 minutes, at ambient temperature.

The reaction mixture has the following molar composition: 100 SiO$_2$: 1.67 Al$_2$O$_3$: 50 Na$_2$O: 10 DABCO-C4: 0.13 CuO: 0.13 TETA: 4000 H$_2$O Maturation Step The reaction mixture obtained in the mixing step is kept at ambient temperature with stirring for 24 hours.

Hydrothermal Treatment Step

The gel obtained is introduced into an autoclave and heated at a temperature of 150° C. for 6 days with stirring at 200 rpm. The crystals obtained are separated and washed with deionized water until a pH of the washing water of less than 8 is obtained. The washed material is dried.

Heat Treatment (Calcination) Step

The crude synthetic Cu-SSZ-16 zeolite is treated under a stream of dry N$_2$ at 550° C. for 8 h, then calcined under a stream of dry air at 550° C. for 8 h.

The XRD analyses show that the product obtained is an SSZ-16 aluminosilicate zeolite (ICDD sheet, PDF 04-03-1370). The X-ray fluorescence (XRF) chemical analysis gave an Si/Al molar ratio of 6.5 and a weight percentage of Cu of 1%.

Cu Ion Exchange on Cu-SSZ-16

The calcined Cu-SSZ-16 zeolite is bought into contact with a [Cu(NH$_3$)$_4$](NO$_3$)$_2$ solution for 1 day with stirring at ambient temperature. The final solid is separated and washed and the exchange operation is repeated once more.

Heat Treatment (Calcination) Step

The Cu-SSZ-16 zeolite obtained after contact with the [Cu(NH$_3$)$_4$](NO$_3$)$_2$ solution is treated under a stream of dry N$_2$ at 550° C. for 8 h, then calcined under a stream of dry air at 550° C. for 8 h.

An XRD analysis shows that the product obtained is a pure SSZ-16 zeolite with AFX structure (ICDD sheet, PDF 04-03-1370).

The X-ray fluorescence (XRF) chemical analysis gave an Si/Al molar ratio of 6.5 and a weight percentage of Cu of 6.5%.

Example 6 (not in Accordance with the Invention)

In this example, an SSZ-16 zeolite is synthesized with incorporation of the copper in two steps: first step in the synthesis of the zeolite using a Cu-Triethylenetetramine (TETA) complex followed by a second step after the calcination of the zeolite by ion exchange with the [Cu(NH$_3$)$_4$](NO$_3$)$_2$ complex. The final percentage of Cu in the calcined zeolite is less than 1.5%.

Mixing Step 17.37 g of sodium hydroxide are dissolved in 507 g of deionized water, with stirring (300 rpm) and at ambient temperature. 198 g of sodium silicate are added to this solution and the mixture is homogenized with stirring at 300 rpm at ambient temperature. Then, 9.95 g of NaY CBV100 zeolite are poured into the solution previously obtained with stirring at 300 rpm and this is thus continued until the zeolite has dissolved. This solution is referred to as solution 4-1.

0.16 g of copper sulfate are dissolved in 73 g of deionized water with stirring for 10 minutes then 0.10 g of triethylenetetramine (TETA) are dissolved in this copper solution. Then, this solution is poured into the solution 4-1 with stirring at 300 rpm. The mixture is homogenized for 10 min with stirring (300 rpm) and then 43.7 of the DABCO-C4 structuring agent are added and it is thus homogenized with stirring at 300 rpm for 10 minutes, at ambient temperature.

The reaction mixture has the following molar composition: 100 SiO$_2$: 1.67 Al$_2$O$_3$: 50 Na$_2$O: 10 DABCO-C4: 0.06 CuO: 0.06 TETA: 4000 H$_2$O Maturation Step The reaction mixture obtained in the mixing step is kept at ambient temperature with stirring for 24 hours.

Hydrothermal Treatment Step

The gel obtained is introduced into an autoclave and heated at a temperature of 150° C. for 6 days with stirring at 200 rpm. The crystals obtained are separated and washed with deionized water until a pH of the washing water of less than 8 is obtained. The washed material is dried.

Heat Treatment (Calcination) Step

The crude synthetic Cu-SSZ-16 zeolite is treated under a stream of dry N$_2$ at 550° C. for 8 h, then calcined under a stream of dry air at 550° C. for 8 h.

The XRD analyses show that the product obtained is an SSZ-16 aluminosilicate zeolite (ICDD sheet, PDF 04-03-1370). The X-ray fluorescence (XRF) chemical analysis gave an Si/Al molar ratio of 6.5 and a weight percentage of Cu of 0.5%.

Cu Ion Exchange on Cu-SSZ-16

The calcined Cu-SSZ-16 zeolite is bought into contact with a $[Cu(NH_3)_4](NO_3)_2$ solution for 2 hours with stirring at ambient temperature. The solid obtained are separated, washed and dried.

Heat Treatment (Calcination) Step

The Cu-SSZ-16 zeolite obtained after contact with the $[Cu(NH_3)_4](NO_3)_2$ solution is treated under a stream of dry $N_2$ at 550° C. for 8 h, then calcined under a stream of dry air at 550° C. for 8 h.

An XRD analysis shows that the product obtained is a pure SSZ-16 zeolite with AFX structure (ICDD sheet, PDF 04-03-1370).

The X-ray fluorescence (XRF) chemical analysis gave an Si/Al molar ratio of 6.5 and a weight percentage of Cu of 1.2%.

Example 7

In order to evaluate the $NO_x$ conversion activity of the various materials prepared, a catalytic test is carried out for the reduction of nitrogen oxides ($NO_x$) by ammonia ($NH_3$) in the presence of oxygen ($O_2$) at various operating temperatures. The materials not in accordance with the invention, prepared according to examples 1 and 2 are compared to the materials in accordance with the invention, prepared according to examples 3 and 4.

For each test, 200 mg of material in powder form is placed in a quartz reaction vessel. 145 l/h of a representative feedstock of a mixture of exhaust gas from a diesel engine are fed into the reaction vessel.

This feedstock has the following molar composition:

| | |
|---|---|
| $O_2$ | 8.5% |
| $CO_2$ | 9% |
| NO | 400 ppm |
| $NH_3$ | 400 ppm |
| $H_2O$ | 10% |
| $N_2$ | qpc |

Figure 2:
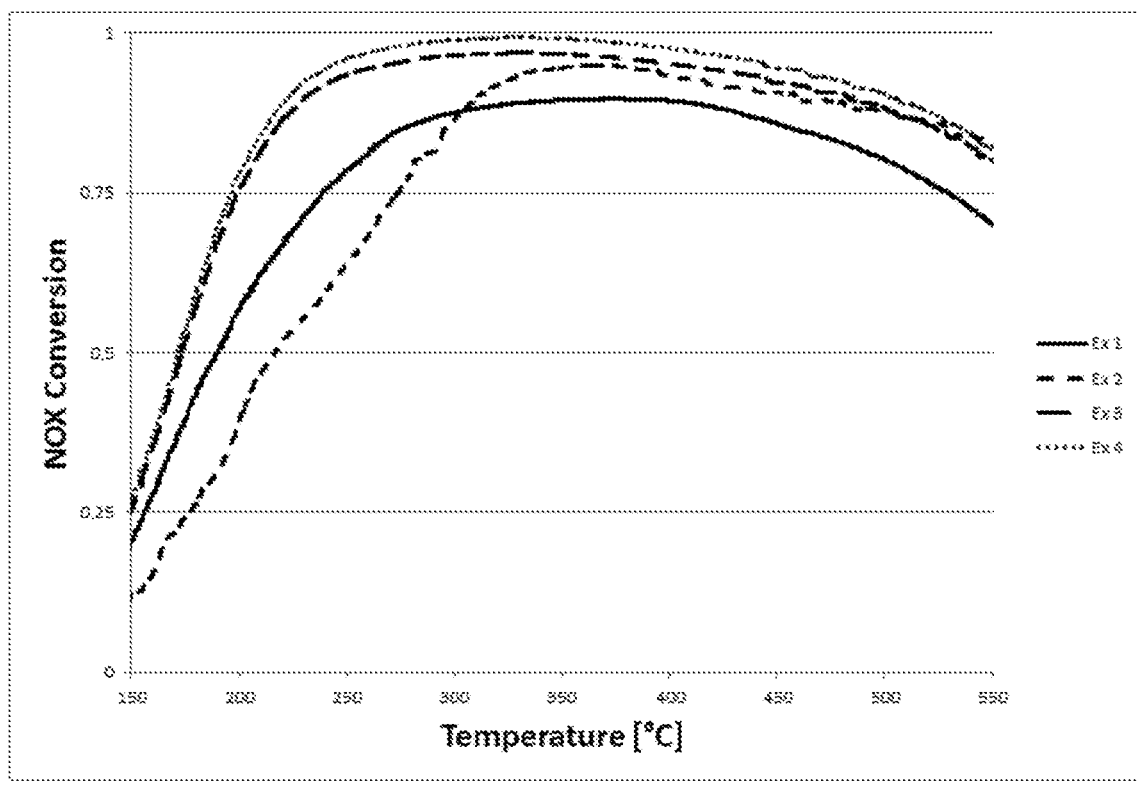
FIG. 2 shows the NOx conversion results, the Ex 1, Ex 2, Ex 3 and Ex 4 curves respectively corresponding to the tests carried out with the materials prepared according to example 1, example 2, example 3 and example 4. At the abscissa point 400° C., the curves correspond, respectively, from bottom to top to Ex 1, Ex 2, Ex 3 and Ex 4.
Figure 3:
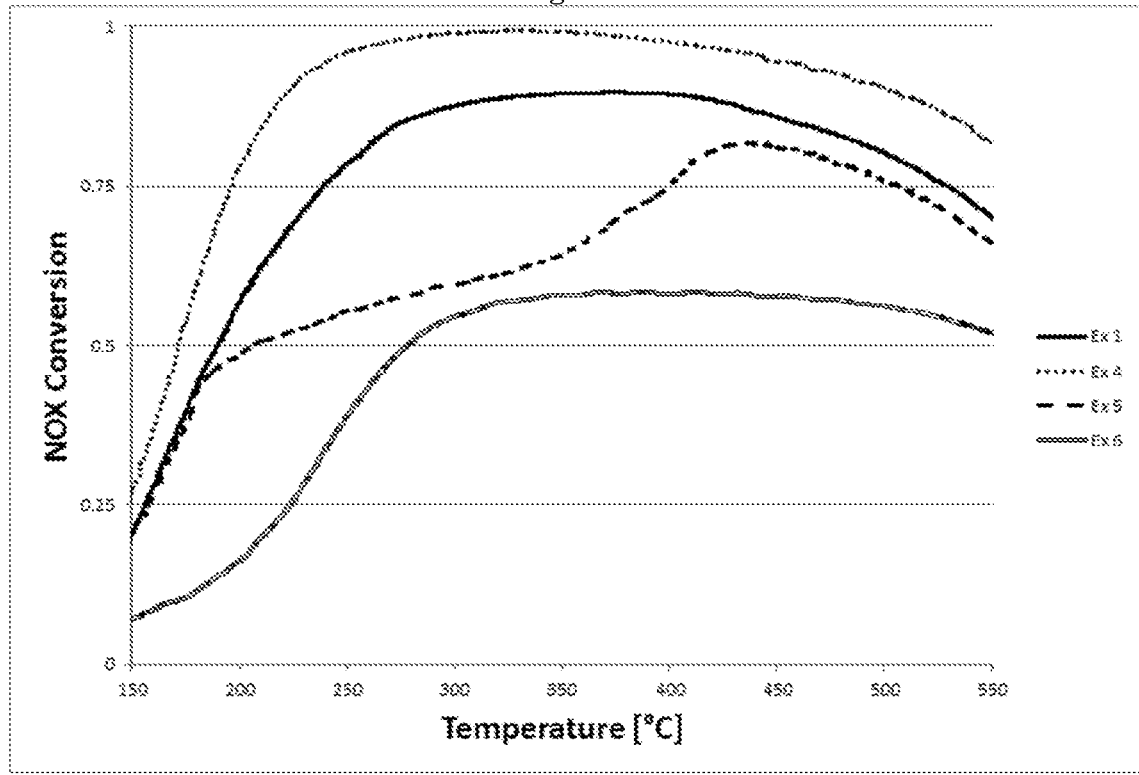
FIG. 3 shows the NOx conversion results, the Ex 1, Ex 4, Ex 5 and Ex 6 curves respectively corresponding to the tests carried out with the materials prepared according to example 1, example 4, example 5 and example 6. At the abscissa point 400° C., the curves correspond, respectively, from bottom to top to EX 6, Ex 5, Ex 1 and Ex 4.

The conversion results are shown in FIGS. 2 and 3, the Ex 1, Ex 2, Ex 3, Ex 4, Ex 5 and Ex 6 curves respectively corresponding to the tests carried out with the materials prepared according to example 1, example 2, example 3, example 4, example 5 and example 6.

It is observed that the materials prepared according to the invention have a better $NO_x$ conversion than the materials prepared according to example 1, example 2, example 5 or example 6, this being for all the temperatures tested.

The invention claimed is:

1. A process for preparing a copper-containing microporous aluminosilicate material with AFX structure, comprising at least the following steps:
   a) mixing, in an aqueous medium, of at least one aluminum source, at least one silicon source, sodium hydroxide, at least one copper source, an organic complexing agent (OCPLX) chosen from triethylenetetramine (TETA) or tetraethylenepentamine (TEPA) and a structuring agent 1,4-diazabicyclo[2.2.2]octane-C4-diquat dibromide (DABCO-C4), in order to obtain a gel of molar composition:

a/b being between 100 and 40, c/b being between 25 and 50, d/b being between 3 and 10, e/b being between 0.05 and 0.1, f/e being between 1 and 1.5 and g/b being between 4000 and 1000;
   b) hydrothermal treatment of the gel at a temperature of between 130 and 180° C., under an autogenous reaction pressure, for a period of between 1 and 8 days with stirring in order to obtain the crystallization of the copper-comprising microporous aluminosilicate material with AFX structure;
   c) drying heat treatment of the solid obtained at the end of the preceding step at a temperature of between 80 and 120° C. under a stream of inert gas followed by calcining under dry air at a temperature of between 400 and 600° C.;
   d) ion exchange comprising bringing the solid obtained the end of the preceding step into contact with a solution comprising a species capable of releasing copper in solution in reactive form with stirring at ambient temperature for a period of between 1 h and 2 d;
   e) drying heat treatment of the solid obtained at the end of the preceding step at a temperature of between 80 and 120° C. followed by calcining under a stream of inert gas and then air at a temperature of between 400 and 600° C.;
   the total amount of copper contained in the material obtained at the end of the preparation process being between 1.5 and 5.75% by weight relative to the total weight of the material in its anhydrous form.

2. The process as claimed in claim 1, wherein steps c) and d) are inverted.

3. The process as claimed in claim 1, wherein the amount of copper introduced during step a) represents between 0.75 and 2%, the amount of copper introduced during step d) representing between 0.75 and 5%, the amount of copper contained in the material being ultimately between 1.5 and 5.75%, all the percentages being percentages by weight relative to the total weight of the material in its anhydrous form obtained at the end of the preparation process.

4. The process as claimed in claim 1, wherein a maturation step at ambient temperature is carried out at the end of step a) and before step b).

5. The process as claimed in claim 4, wherein the step b) is carried out at a temperature of between 140 and 170° C.

6. The process as claimed in claim 1, wherein the step b) is carried out for a period of between 3 and 6 days.

7. The process as claimed in claim 1, wherein the step b) is carried out with stirring with a rotation of the stirring shaft of between 100 and 4000 rotations per minute.

8. The process as claimed in claim 1, wherein the step b) is carried out with stirring with a rotation of the stirring shaft of between 200 and 2000 rotations per minute.

9. The process as claimed in claim 1, wherein the dry air flow rate of the calcination treatment in the course of the step c) is between 0.5 and 1.5 Whig of solid to be treated.

10. A copper-comprising microporous aluminosilicate material with AFX structure obtained by a process as claimed in claim 1.

11. A method comprising selectively reducing $NO_x$ with a reducing agent in the presence of the copper-comprising microporous aluminosilicate with AFX structure as claimed in claim 10.

12. The method as claimed in claim 11, wherein the copper-comprising microporous aluminosilicate material with AFX structure is formed by deposition in the form of a coating on a honeycomb structure.

13. The method as claimed in claim 12, wherein the coating comprises the material in combination with a binder comprising cerine, zirconium oxide, alumina, non-zeolite silica-alumina, titanium oxide, a cerine-zirconia mixed oxide, or a tungsten oxide.

14. The method as claimed in claim 12, wherein the coating is in combination with another coating having $NO_x$ reducing capacities or capacities which promote the oxidation of pollutants.

15. The method as claimed in claim 11, wherein a structure coated by the material is integrated in an exhaust line of an internal combustion engine.

16. The method as claimed in claim 11, wherein the reducing agent is $NH_3$ or $H_2$.

* * * * *